Sept. 1, 1970     YASUYOSHI ONAKA     3,526,692
MANUFACTURE OF WIRE REINFORCED PLASTIC PIPE
Filed May 24, 1968     2 Sheets-Sheet 1
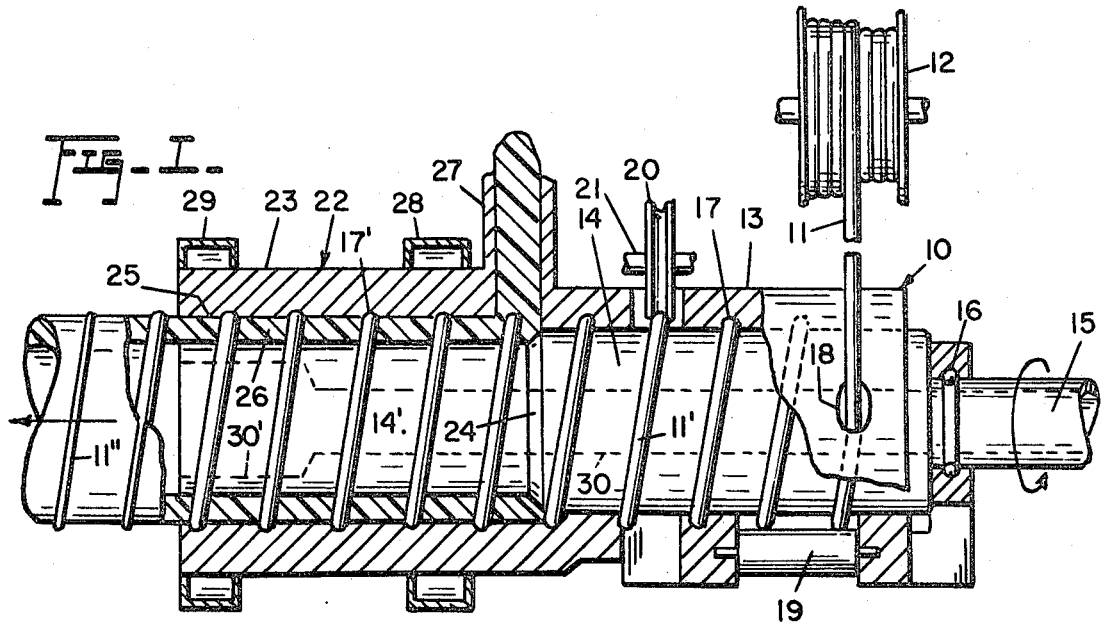
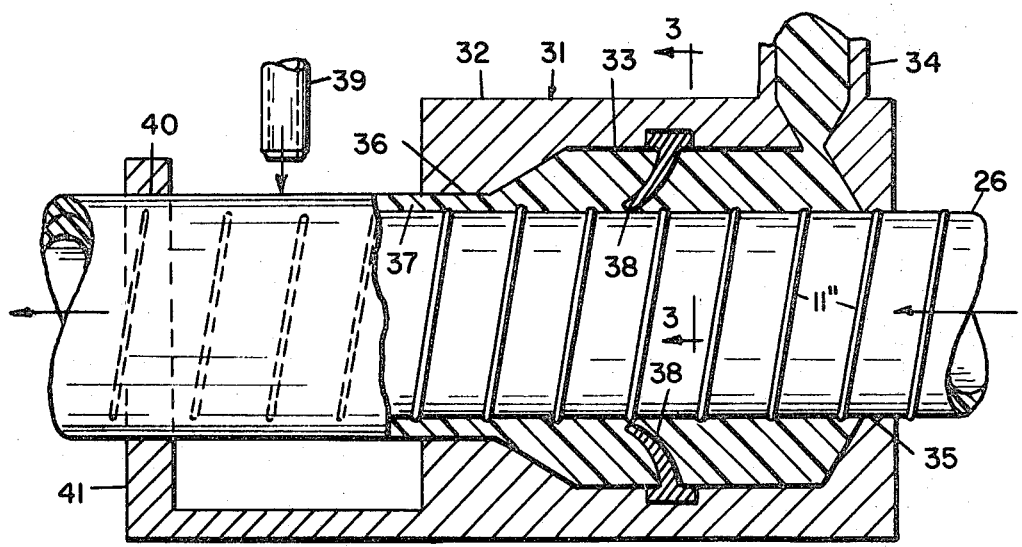
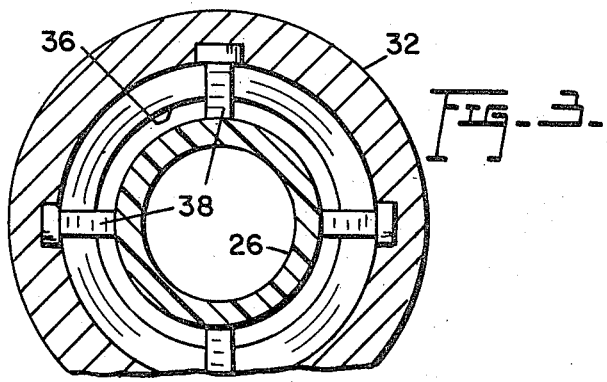
INVENTOR:
YASUYASHI ONAKA
By: *Kurt Kelman*
Agent Sept. 1, 1970  YASUYOSHI ONAKA  3,526,692

MANUFACTURE OF WIRE REINFORCED PLASTIC PIPE

Filed May 24, 1968  2 Sheets-Sheet 2

INVENTOR:
YASUYASHI ONAKA
By: *Kurt Kelman*
Agent

United States Patent Office 3,526,692
Patented Sept. 1, 1970

3,526,692
MANUFACTURE OF WIRE REINFORCED
PLASTIC PIPE
Yasuyoshi Onaka, 3530-3 Izumi, Komaemachi,
Kitatamagun, Tokyo, Japan
Filed May 24, 1968, Ser. No. 731,878
Claims priority, application Japan, May 26, 1967,
42/33,758; July 21, 1967, 42/46,989
Int. Cl. B29d 23/00
U.S. Cl. 264—209  8 Claims

ABSTRACT OF THE DISCLOSURE

Mechanism for continuously coiling wire into a helix and feeding the helix axially through a plastic extruding die where a plastic pipe body is extruded so that the wire helix is embedded in but projects from the outer surface of the pipe body. The pipe body with the embedded helix is then passed through a second plastic extruding die in which a tubular plastic layer is bonded to the outer surface of the pipe body and covers the projecting helix to constitute the finished pipe.

---

This invention relates to new and useful improvements in the art of manufacturing wire reinforced plastic pipe, particularly flexible plastic pipe used for conveying liquids under suction where reinforcement of the pipe is necessary in order to safeguard against collapsing of the pipe under external atmospheric pressure.

In accordance with conventional practice pipes of this type were manufactured by first wrapping a wire helix around the outside of a plastic pipe body, and then covering the pipe body and the wire helix by an outside plastic layer. The difficulty encountered with a conventional pipe of this construction is that under suction of the conveyed liquid, the inner plastic pipe body often separates from the outside plastic layer and collapses, nothwithstanding the presence of the wire helix which supports the outside layer but is wholly ineffective in preventing collapse of the inner pipe body itself.

It is, therefore, the principal object of the invention to provide an improved method of and apparatus for manufacturing wire reinforced plastic pipe wherein the reinforcing wire helix is associated with the plastic pipe body and with the outer plastic layer in such manner that separation of the inner pipe body from the outer layer is virtually impossible and that the wire helix effectively serves to prevent collapsing of the pipe, even in the presence of very strong suction.

Briefly, the invention involves coiling of reinforcing wire into a continuous helix which is fed axially through a plastic extruding die. There a plastic pipe body is extruded so that the wire helix becomes embedded n but projects somewhat from the outer surface of the pipe body. The pipe body with the embedded helix is then passed through a second plastic extruding die where a tubular plastic layer is firmly bonded to the outside of the pipe body and covers the projecting wire helix to constitute the finished pipe.

With the foregoing more important object and features in view and such other objects and features as may become apparent as this specification proceeds, the invention will be understood from the following description taken in conjunction with the accompanying drawings, wherein like characters of reference are used to designate like parts, and wherein:

FIG. 1 is a fragmentary longitudinal sectional view, partly in elevation, showing the helix forming mechanism and first stage extruding die of the apparatus;

FIG. 2 is a longitudinal sectional view of the second stage extruding die;

FIG. 3 is a fragmentary cross-sectional view taken substantially in the plane of the line 3—3 in FIG. 2;

Figure 4:
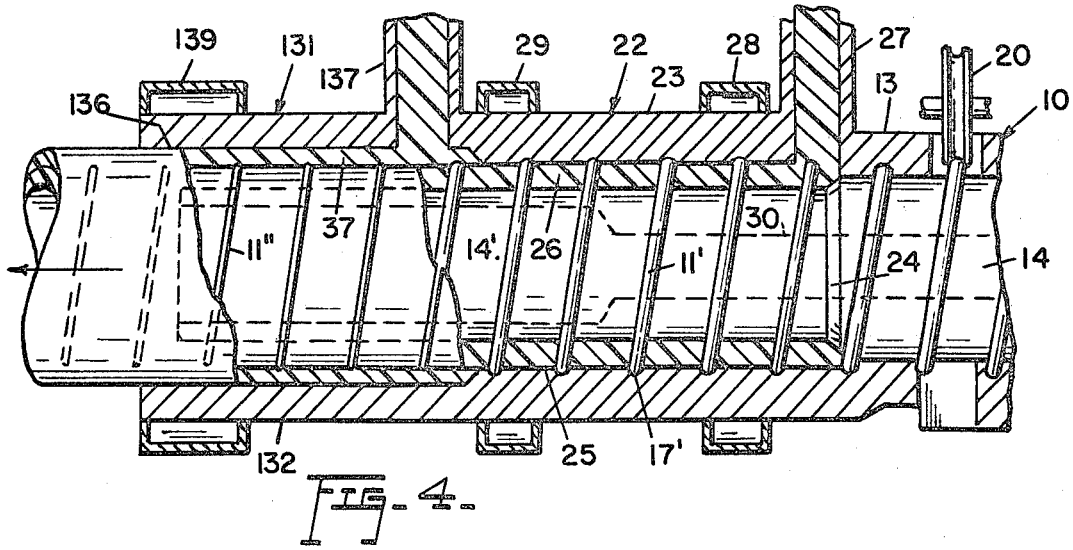
FIG. 4 is a fragmentary longitudinal sectional view, partly in elevation, showing a modified embodiment wherein the helix forming mechanism is associated with both the first stage and second stage extruding dies.

Referring now to the accompanying drawings in detail, particularly to FIG. 1 thereof, the apparatus of the invention comprises a wire helix forming mechanism 10 wherein suitable reinforcing wire 11, such as piano wire for example, is coiled into a helix 11' for embodiment into a plastic pipe to be manufactured.

The wire 11 is supplied to the mechanism 10 from a suitable source 12, and the mechanism 10 comprises a relatively stationary, hollow cylinder 13 containing a rotatable mandrel 14, the latter being connected to and driven by a shaft 15 journalled in suitable bearing means 16. The inside of the cylinder 13 is provided with a helical groove 17 into which the wire 11 is fed through a lateral opening 18 in the cylinder 13, so that as the mandrel 14 is rotated relative to the cylinder, the wire is wound helically around the mandrel and is also fed helically around the groove 17, thus producing the formed helix 11' which advances axially as the coiling operation continues.

Since the wire possesses some resiliency which offers some resistance to coiling, the first few turns of the wire are pressed against the mandrel 14, as by a pressing roller 19 which is rotatably mountel in a side of the cylinder 13. Also, to assist in feeding the wire helix 11' along the groove 17, a drive roller 20, suitably driven by a shaft 21, is provided in a side of the cylinder 13, the roller 20 operatively engaging one of the turns of the wire helix and assisting feeding of the helix along the groove 17 as the mandrel 14 is rotated in the cylinder 13.

The formed wire helix 11' is fed axially into a first stage plastic extruding die 22 consisting of a cylindrical die body 23 formed at the inside thereof with a helical groove 17' which constitutes a continuation of the groove 17 in the coiling cylinder 13. The die body 23 is coaxial with and rigidly connected to the cylinder 13, and if desired the die body and the cylinder may be integrally formed. The die body 23 contains a mandrel portion 14' which may be an integral extension of the mandrel 14, and it will be noted that the mandrel portion 14' is of a smaller diameter than the mandrel 14 so that an annular step 24 exists at the junction of the two. The mandrel portion 14' is spaced from the inside of the die body 23 so as to provide an annular nozzle 25 through which a plastic pipe body may be extruded as indicated at 26. Viscous plastic material such as a suitable thermoplastic resin composition is introduced under pressure into the die 22 through an inlet 27, and the die is equipped with a suitable heater 28 and a cooler 29 in accordance with conventional practice. Also, cooling fluid may be passed through the shaft 15 and through a bore 30 in the mandrel unit 14, 14' into an enlarged cooling chamber 30' in the end of the mandrel portion 14', as will be clearly apparent.

Figure 5:
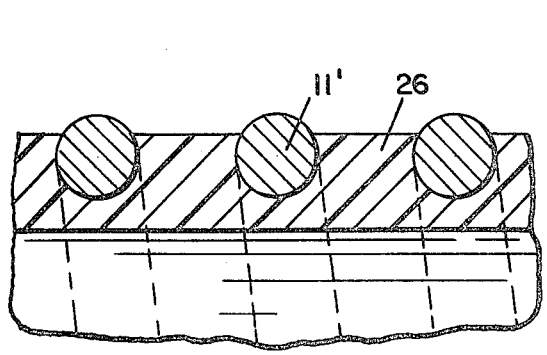
FIG. 5 is an enlarged, fragmentary sectional detail showing the plastic pipe body with the embedded helix at the completion of the first extruding operation.

When the wire helix 11' formed in the cooling mechanism 10 is fed axially through the die 22 and plastic material is extruded through the nozzle 25 of the die, the plastic pipe body 26 will be formed so that the wire helix 11' becomes embedded in the pipe body as indicated in FIG. 5. The effective relative diameters of the components are such that the wire helix is embedded in the outer surface portion of the pipe body and projects outwardly therefrom to some extent, preferably less than half the thickness of the wires, so that the plastic pipe body embraces more than half the cross-section of the wire as shown in FIG. 5, whereby to positively resist any tendency of the plastic pipe body collapsing inwardly by separation from the wire helix.

Figure 6:
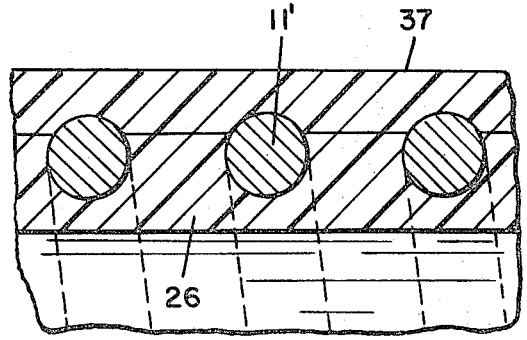
FIG. 6 is a view similar to that in FIG. 5 but showing the completed pipe after the second extruding operation.

The plastic pipe body with the embedded wire helix is then passed through a second stage plastic extruding die 31 shown in FIGS. 2 and 3, which may be a separate entity from the apparatus shown in FIG. 1. The die 31 comprises a die body 32 formed with a chamber 33 into which viscous plastic material is fed under pressure through an inlet 34. The plastic pipe body 26 is fed axially into the chamber 33 through an opening 35 in the die body 32, the diameter of the opening 35 corresponding substantially to the outside diameter of the wire helix 11', which is embedded in the pipe body. The pipe body 26 passes outwardly from the die through a nozzle 36 which is of a greater diameter than the wire helix 11', so that there is extruded a layer 37 of plastic, which is firmly bonded to the outer surface of the pipe body 26 and totally covers the projecting wire helix, as will be apparent from FIG. 6.

Resiliently flexible fingers 38 are provided in the chamber 33 to hold the pipe body 26 centralized during its passage through the chamber and through the extruding nozzle 36, and when the finished pipe leaves the extruding nozzle it is cooled as by water discharged from a supply pipe 39. The finished pipe is then guided through an opening 40 in a guide bracket 41 connected to the die body 32, the diameter of the opening 40 corresponding to the outside diameter of the finished pipe.

The thermo-plastic resin composition extruded in the second stage die 31 preferably is the same as that extruded in the first stage die 22, and the plastic layer 37 extruded in the first mentioned die becomes firmly bonded to the outer surface of the plastic pipe body 26 extruded in the first die. Moreover, as will be apparent from FIG. 6, the outer plastic layer 37 covers the wire helix 11' and, by virtue of its firm bond to the inner pipe body 26, the outer layer is effectively reinforced by the wire helix so that separation of the inner pipe body from the outer layer and collapsing of the pipe under external pressure is virtually impossible.

Figure 7:
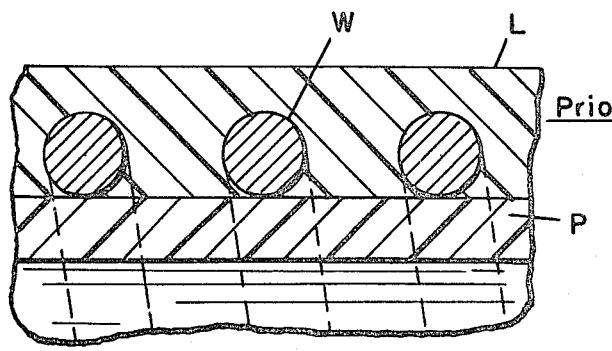
FIG. 7 is a fragmentary sectional detail showing conventional pipe construction as practiced in the prior art.

By contrast, FIG. 7 shows a conventional pipe constructed according to prior art wherein reinforcing wire W is first wound helically around an already existing plastic pipe body P and is then covered by an outside plastic layer L. In this instance the wire helix is contained wholly within the thickness of the outer layer L, and when the pipe is subjected to external pressure, the inner pipe body P frequently breaks away from the outer layer L and collapses, notwithstanding the fact that the outer layer remains supported by the reinforcing wire.

FIG. 4 illustrates a modified embodiment of the apparatus wherein the second stage extruding die 131 is combined with the first stage die 22 and with its helix forming mechanism 10 into a single entity, rather than being separate therefrom as in FIG. 2. In this modified embodiment the body 132 of the second die may be an integral, axial extension of the body 23 of the first die 22, with the extruding nozzle 136 of the second die having a larger diameter than the nozzle 25 of the first die, so that as the plastic pipe body 26 with the wire helix 11' embedded therein passes from the first die into the second die, it becomes covered by the outer plastic layer 37 extruded in the nozzle 136 of the second die. This continuous operation is effective to produce an even more intimate bonding of the outer layer 37 to the inner pipe body 26 than may be obtained when the second die is a separate entity, removed from the first die. As shown in FIG. 4, the second die body 132 has a plastic material inlet 137 and is also equipped with a cooler 139 for the finished pipe. It will be also noted that the mandrel portion 14' of the first die 22 is extended into the second die 131 to effectively support the pipe body 26 during its passage through the second die, so that provision of centering means such as the fingers 38 in the embodiment of FIG. 2 is not necessary.

While in the foregoing there have been described and shown the preferred embodiments of the invention, various modifications may become apparent to those skilled in the art to which the invention relates. Accordingly, it is not desired to limit the invention to this disclosure, and various modifications and equivalents may be resorted to, falling within the spirit and scope of the invention as claimed.

What is claimed as new is:

1. A method of manufacturing wire reinforced plastic pipe, the steps of continuously forming a wire helix, feeding the helix in an axial direction through a plastic extruding die, extruding a plastic pipe body in said die so that the wire helix becomes embedded in but projects outwardly from the outer surface of the pipe body, passing the pipe body with the embedded helix through a second stage plastic extruding die, and extruding a tubular plastic layer in the second stage die so that said layer becomes bonded to the outer surface of the plastic pipe body and covers the projecting wire helix to constitute the finished pipe.

2. The method as defined in claim 1 which is characterized further in that step of feeding the wire helix includes the step of imparting rotation to the helix about its axis while the helix engages a helical groove in a helix forming apparatus.

3. The method as defined in claim 2 which is further characterized in that said step of feeding the wire helix includes the step of continuing rotation of the helix about its axis while the helix engages a helical groove in said first mentioned extruding die.

4. In an apparatus for manufacturing wire reinforced plastic pipe, the combination of means continuously forming a wire helix, said means including means feeding the formed helix in an axial direction, a first stage plastic extruding die receiving the formed helix from said helix forming means, said first stage die being operative to extrude a plastic pipe body with the wire helix embedded therein but projecting outwardly from the outer surface thereof, and a second stage plastic extruding die receiving the pipe body with the embedded helix, said second stage die being operative to extrude a tubular plastic layer bonded to the outer surface of the pipe body and covering the projecting wire helix to constitute the finished pipe.

5. The apparatus as defined in claim 4 wherein said helix forming and feeding means comprise a relatively stationary hollow cylinder provided on the inside thereof with a helical wire receiving groove, and a rotatable mandrel positioned in said cylinder for helical winding and feeding of wire in said groove by rotation of the mandrel relative to the cylinder.

6. The apparatus as defined in claim 4 wherein said first stage extruding die comprises a relatively stationary die body provided at the inside thereof with a helical wire receiving groove, and a rotatable mandrel positioned in said die body in spaced relation therefrom, whereby to form an extruding nozzle between the inside of the die body and said mandrel.

7. The apparatus as defined in claim 4 wherein said helix forming and feeding means comprise a relatively stationary hollow cylinder provided on the inside thereof with a helical wire receiving groove, and a rotatable mandrel positioned in said cylinder for helical winding and feeding of wire in said groove by rotation of the mandrel relative to the cylinder, said first stage extruding die comprising a relatively stationary die body coaxial with said cylinder and provided at the inside thereof with a helical wire receiving groove which constitutes a continuation of the groove in said cylinder, and a mandrel extension coaxial and rotatable with said mandrel, said mandrel extension being disposed in said die body in spaced relation therefrom to form an extruding nozzle between the inside of the die body and the mandrel extension, said mandrel extension being of a smaller diameter than said mandrel.

8. The apparatus as defined in claim 7 wherein said second stage extruding die comprises a die body having a nozzle of a greater diameter than the nozzle of the first stage extruding die.

References Cited

UNITED STATES PATENTS

| | | |
|---|---|---|
| 1,111,418 | 9/1914 | Wadsworth. |
| 2,491,152 | 12/1949 | Beidle. |
| 2,513,106 | 6/1950 | Prendergast. |
| 2,620,514 | 12/1952 | Sampson etal. |
| 2,730,762 | 1/1956 | Ballard. |
| 3,375,550 | 4/1968 | Klein. |

WILLIAM J. STEPHENSON, Primary Examiner

U. S. Cl. X.R.

18—13; 264—267